(12) United States Patent
Avramidis et al.

(10) Patent No.: US 11,427,667 B2
(45) Date of Patent: Aug. 30, 2022

(54) VINYL ACRYLIC COPOLYMERS AND METHODS OF MAKING AND USE THEREOF

(71) Applicant: BASF SE, Ludwigshafen am Rhein (DE)

(72) Inventors: Kostas Avramidis, Charlotte, NC (US); Don Cho, Fort Mill, SC (US); Barry Fowler, Cleveland, TN (US); John Bennett, Lupton City, TN (US)

(73) Assignee: BASF SE, Ludwigshafen am Rhein (DE)

( * ) Notice: Subject to any disclaimer, the term of this patent is extended or adjusted under 35 U.S.C. 154(b) by 178 days.

(21) Appl. No.: 16/760,105

(22) PCT Filed: Oct. 31, 2017

(86) PCT No.: PCT/US2017/059202
§ 371 (c)(1),
(2) Date: Apr. 29, 2020

(87) PCT Pub. No.: WO2019/088991
PCT Pub. Date: May 9, 2019

(65) Prior Publication Data
US 2020/0255707 A1    Aug. 13, 2020

(51) Int. Cl.
| | |
|---|---|
| *C08F 230/08* | (2006.01) |
| *C08F 220/06* | (2006.01) |
| *C08F 220/08* | (2006.01) |
| *C08F 251/00* | (2006.01) |
| *C08L 51/02* | (2006.01) |
| *C09J 151/02* | (2006.01) |
| *D06N 7/00* | (2006.01) |

(52) U.S. Cl.
CPC .......... *C08F 230/08* (2013.01); *C08F 220/06* (2013.01); *C08F 220/08* (2013.01); *C08F 251/00* (2013.01); *C08L 51/02* (2013.01); *C09J 151/02* (2013.01); *D06N 7/0073* (2013.01); *D06N 2203/045* (2013.01)

(58) Field of Classification Search
None
See application file for complete search history.

(56) References Cited

U.S. PATENT DOCUMENTS

| | | | |
|---|---|---|---|
| 6,080,813 A | 6/2000 | Wendel et al. | |
| 2008/0153946 A1* | 6/2008 | Kelly | C09D 133/02 524/80 |

FOREIGN PATENT DOCUMENTS

| | | |
|---|---|---|
| WO | WO-2014031579 A2 | 2/2014 |
| WO | WO-2015155159 A1 | 10/2015 |
| WO | WO-2016008814 A1 | 1/2016 |

OTHER PUBLICATIONS

International Search Report for PCT/US2017/059202 dated Jul. 9, 2018.
Written Opinion of the International Searching Authority for PCT/US2017/059202 dated Jul. 9, 2018.

* cited by examiner

*Primary Examiner* — Jeffrey D Washville
(74) *Attorney, Agent, or Firm* — Faegre Drinker Biddle & Reath LLP

(57) ABSTRACT

Described herein are compositions comprising a vinyl acrylic copolymer derived in the presence of maltodextrin. In some examples, the compositions comprise a copolymer derived from: vinyl acetate; an acrylate monomer having a Tg of −30° C. or less; a carboxylic acid, a carboxylic acid anhydride, or a combination thereof; and an organosilane; in the presence of maltodextrin. The copolymer can be provided as an aqueous dispersion. In some examples, the aqueous dispersion can have an overall solids content of from 40% to 75%. Also disclosed herein are carpet tiles having a surface coated with the adhesive formulations disclosed herein. In some examples, the carpet tile with the adhesive formulation applied thereto can pass the British spill test. Also disclosed herein are methods of making the compositions disclosed herein.

19 Claims, No Drawings

VINYL ACRYLIC COPOLYMERS AND METHODS OF MAKING AND USE THEREOF

CROSS-REFERENCE TO RELATED APPLICATIONS

This application is a national stage application (under 35 U.S.C. § 371) of PCT/US2017/059202, filed Oct. 31, 2018, which is incorporated herein by reference in its entirety.

TECHNICAL FIELD

The present disclosure related generally to copolymer compositions for use in adhesive formulations for carpet tile applications, and methods of making the same.

BACKGROUND

In carpet tile applications, vinyl acetate-ethylene (VAE) latexes have been the predominant binders used with polyvinyl chloride (PVC) backing systems. PVC backings must be flexibilized using high levels of plasticizers. These plasticizers can migrate to the surface at the point of the adhesive layer. This can reduce bond strength resulting in premature delamination from the PVC backing layer when using certain latex types. While VAE latexes have excellent resistance to plasticizer migration, the VAE latexes are more hydrophilic than other latexes and as such have inferior wet strength compared to acrylic polymers. An adhesive formulation with excellent resistance to the plasticizer migration and excellent wet strength is needed for carpet tile applications. The compositions discussed herein address these and other needs.

SUMMARY

Described herein are compositions comprising a vinyl acrylic copolymer derived in the presence of maltodextrin. In some examples, the compositions comprise a copolymer derived from: vinyl acetate; an acrylate monomer having a glass transition temperature ($T_g$) of −30° C. or less; a carboxylic acid, a carboxylic acid anhydride, or a combination thereof; and an organosilane; in the presence of maltodextrin. In some examples, the copolymer can be derived from 30% to 90% by weight vinyl acetate, based on the total monomer content (e.g., from 45% to 75%).

The acrylate monomer can, for example, comprise butyl acrylate, ethylhexyl acrylate, or a combination thereof. In some examples, the acrylate monomer can comprise butyl acrylate. The copolymer can, for example, be derived from 20% to 70% by weight of the acrylate monomer, based on the total monomer content (e.g., from 30% to 60%).

As disclosed herein, the copolymer is derived from a carboxylic acid, a carboxylic acid anhydride, or a combination thereof. The carboxylic acid, carboxylic acid anhydride, or a combination thereof can, for example, be derived from a monocarboxylic acid, a dicarboxylic acid, or a combination thereof. In some examples, the carboxylic acid, carboxylic acid anhydride, or a combination thereof can be selected from the group consisting of (meth)acrylic acid, itaconic acid, crotonic acid, fumaric acid, maleic acid, anhydrides thereof (e.g., itaconic anhydride, maleic anhydride), and combinations thereof. In some examples, the carboxylic acid comprises acrylic acid.

The copolymer can, for example, be derived from greater than 0% to 10% by weight carboxylic acid, carboxylic acid anhydride, or a combination thereof, based on the total monomer weight (e.g., from 0.5% to 2%).

As disclosed herein, the copolymer is derived from an organosilane. In some examples, the organosilane comprises a vinyl silane. The organosilane can, for example, comprise vinyltrimethoxysilane, vinyltriethoxysilane, vinyl tris(2-methoxyethoxysilane), vinyl triisopropoxysilane, gamma-methacryloxypropyltrimethoxy silane, or combinations thereof. In some examples, the organosilane comprises vinyltriethoxysilane. The copolymer can, for example, be derived from 0.05% to 2% by weight of the organosilane, based on the total monomer weight (e.g., from 0.1% to 0.5%).

In addition to the monomers, the copolymer is formed in the presence of maltodextrin. The maltodextrin can have, for example, a dextrose equivalent (DE) of from 10 to 50 (e.g., from 10 to 35, from 12.5 to 25, or from 15 to 20). The weight average molecular weight ($M_w$) of the maltodextrin can be, for example, from 3,000 to 20,000 Daltons (e.g., from 5,000 to 17,000 Daltons). In some examples, the maltodextrin can be soluble in water at room temperature in an amount of greater than about 40% by weight. The copolymer can, for example, comprise from 1% to 40% by weight of the maltodextrin (e.g., from 1% to 30% or from 5% to 25% by weight).

In some examples, the copolymer can be polymerized in the presence of a surfactant. The surfactant can include nonionic surfactants, anionic surfactants, cationic surfactants, amphoteric surfactants, or a mixture thereof. In some examples, the surfactant can comprise a non-ionic surfactant and an anionic surfactant. In some examples, the surfactant can include a copolymerizable surfactant. In some examples, the copolymerizable surfactant comprises sodium vinyl sulfonate, 2-acrylamido-2-methylpropane sulfonic acid (AMPS), or a combination thereof.

As described herein, the monomers in the copolymer can, in some examples, be polymerized in the presence of a chain transfer agent. In some examples, the monomers can be polymerized in the presence of a crosslinker, such as triallyl cyanurate, triallyl isocyanurate, diallyl phthalate, butane dioldiacrylate, diallyl maleate, diallyl fumarate, or a combination thereof.

In some examples, the copolymers described herein can have a measured $T_g$ of from −35° C. to 30° C. or from −25° C. to 30° C., as measured by differential scanning calorimetry (DSC) using the mid-point temperature.

Also disclosed herein are blends comprising the copolymers described herein and a second (co)polymer. For example, the second (co)polymer can comprise an acrylic (co)polymer, a carboxylated or non-carboxylated styrene-butadiene (co)polymer, or a combination thereof.

The copolymer can be provided as an aqueous dispersion. In some examples, the aqueous dispersion can have an overall solids content of from 40% to 75% (e.g., from 55% to 75%). The aqueous dispersion can comprise a plurality of copolymer particles having a volume average particle size of from 80 nm to 500 nm.

The aqueous dispersion comprising the copolymer can be used in adhesive formulations. The adhesive formulation can be stable and can, for example, have a minimum viscosity of 5,000 Cp or more and does not fluctuate more than 1000 Cp over a 1 day period as measured by a #5 spindle at 20 RPM on a Brookfield viscometer at a solids content of 75-85%.

The adhesive formulations can be applied to a carpet tile. As such, also disclosed herein are carpet tiles having a surface coated with the adhesive formulations disclosed herein. The surface can, for example, a backing of the carpet tile. The backing can, for example, comprise polyvinylchloride (PVC). In some examples, the adhesive formulation on the carpet tile can have a dry tuft bind strength and a wet tuft bind strength, wherein the wet tuft bind strength is 60% to 70% of the dry tuft bind strength. In some examples, the carpet tile with the adhesive formulation applied thereto can pass the British spill test.

The copolymers and compositions disclosed herein can be prepared by polymerizing the vinyl acetate; an acrylate monomer having a $T_g$ of −30° C. or less; carboxylic acid, carboxylic acid anhydride, or a combination thereof; and organosilane; in the presence of maltodextrin. In some examples, the monomers are polymerized in an aqueous medium. The monomers can, for example, be polymerized at a polymerization temperature of from 20° C. to 95° C. The monomers can be provided over a feed time of from 2 hours to 10 hours.

Additional advantages of the disclosed compositions and methods will be set forth in part in the description which follows, and in part will be obvious from the description. The advantages of the disclosed compositions will be realized and attained by means of the elements and combinations particularly pointed out in the appended claims. It is to he understood that both the foregoing general description and the following detailed description are exemplary and explanatory only and are not restrictive of the disclosed compositions, as claimed.

The details of one or more embodiments of the invention are set forth in the accompanying drawings and the description below. Other features, objects, and advantages of the invention will be apparent from the description and drawings, and from the claims.

DETAILED DESCRIPTION

The compositions and methods described herein may be understood more readily by reference to the following detailed description of specific aspects of the disclosed subject matter and the examples included therein.

Before the present compositions and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

In this specification and in the claims that follow, reference will be made to a number of terms, which shall be defined to have the following meanings.

Throughout the description and claims of this specification, the words "comprise," "include," and other forms of these words, such as "comprising," "comprises," "including," and "includes" are open, non-limiting terms and do not exclude additional elements such as, for example, additional additives, components, integers, or steps. Although the terms "comprising" and "including" have been used herein to describe various embodiments, the terms "consisting essentially of" and "consisting of" can be used in place of "comprising" and "including" to provide for more specific embodiments and are also disclosed.

As used in the description and the appended claims, the singular foams "a," "an," and "the" include plural referents unless the context clearly dictates otherwise. Thus, for example, reference to "a composition" includes mixtures of two or more such compositions, reference to "an agent" includes mixtures of two or more such agents, reference to "the component" includes mixtures of two or more such components, and the like.

"Optional" or "optionally" means that the subsequently described event or circumstance can or cannot occur, and that the description includes instances where the event or circumstance occurs and instances where it does not.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

The term "(meth)acryl . . . " includes "acryl . . . ," "methacryl . . . ," or mixtures thereof.

The term "(co)polymer" includes homopolymers, copolymers, or mixtures thereof.

Described herein are compositions comprising a vinyl acrylic copolymer derived in the presence of maltodextrin. In some examples, the compositions comprise a copolymer derived from: vinyl acetate; an acrylate monomer having a glass transition temperature ($T_g$) of −30° C. or less; a carboxylic acid, a carboxylic acid anhydride, or a combination thereof; and an organosilane, in the presence of maltodextrin.

In some examples, the copolymer can be derived from 30% or more by weight vinyl acetate, based on the total monomer weight (e.g., 35% or more, 40% or more, 45% or more, 50% or more, 55% or more, 60% or more, 65% or more, 70% or more, 75% or more, 80% or more, or 85% or more). In some examples, the copolymer can be derived from 90% or less by weight vinyl acetate, based on the total monomer weight (e.g., 85% or less, 80% or less, 75% or less, 70% or less, 65% or less, 60% or less, 55% or less, 50% or less, 45% or less, or 40% or less). The amount of vinyl acetate the copolymer is derived from can range from any of the minimum values described above to any of the maximum values described above. For example, the copolymer can be derived from 30% to 90% by weight vinyl acetate, based on the total monomer content (e.g., from 30% to 60%, from 60% to 90%, from 45% to 75%, from 40% to 90%, from 50% to 90%, from 70% to 90%, from 80% to 90%, or from 85% to 90%).

As used herein, an acrylate monomer having a $T_g$ of −30° C. or less refers to an acrylate monomer that when homopolymerized forms a polymer having a measured glass transition temperature of −30° C. or less, as measured using differential scanning calorimetry (DSC) using the mid-point temperature using the method described, for example, in ASTM 3418/82. Examples of acrylate monomers having a $T_g$ of −30° C. or less include, but are not limited to, butyl acrylate, 2-ethylhexyl acrylate, iso-decyl acrylate, dodecyl methacrylate, lauryl methacrylate, ethyldiglycol acrylate, heptadecyl acrylate, iso-tridecyl methacrylate, 4-hydroxylbutyl acrylate, hydroxyethylcaprolactone acrylate, 2-propylheptyl acrylate, 2-ethoxyethyl acrylate, 2-methoxyethyl acrylate, dibutyl maleate, dioctyl maleate, and combinations thereof. In some examples, the acrylate monomer comprises butyl acrylate, 2-ethylhexyl acrylate, or a combination thereof. In some examples, the acrylate monomer comprises butyl acrylate. In some examples, the acrylate monomer consists of butyl acrylate.

The copolymer can, for example, be derived from 20% or more by weight of the acrylate monomer, based on the total monomer content (e.g., 25% or more, 30% or more, 35% or more, 40% or more, 45% or more, 50% or more, 55% or more, or 60% or more). In some examples, the copolymer can be derived form 70% or less by weight of the acrylate monomer, based on the total monomer weight (e.g., 65% or less, 60% or less, 55% or less, 50% or less, 45% or less, 40% or less, 35% or less, or 30% or less). The amount of the acrylate monomer the copolymer is derived from can range from any of the minimum values described above to any of the maximum values described above. For example, the copolymer can be derived from 20% to 70% by weight of the acrylate monomer, based on the total monomer content (e.g., from 20% to 45%, from 45% to 70%, from 20% to 30%, from 30% to 40%, from 40% to 50%, from 50% to 60%, from 60% to 70%, from 25% to 65%, or from 30% to 60%).

As disclosed herein, the copolymer is derived from a carboxylic acid, a carboxylic acid anhydride, or a combination thereof. The carboxylic acid, carboxylic acid anhydride, or a combination thereof can, for example, be derived from a monocarboxylic acid, a dicarboxylic acid, or a combination thereof. Examples of suitable carboxylic acids and carboxylic anhydrides include, but are not limited to, (meth) acrylic acid, crotonic acid, dimethacrylic acid, ethylacrylic acid, allylacetic acid, vinylacetic acid maleic acid, fumaric acid, itaconic acid, mesaconic acid, methylenemalonic acid, citraconic acid, maleic anhydride, itaconic anhydride, methylmalonic anhydride, and combinations thereof. In some examples, the carboxylic acid, carboxylic acid anhydride, or a combination thereof can be selected from the group consisting of (meth)acrylic acid, itaconic acid, crotonic acid, fumaric acid, maleic acid, anhydrides thereof (e.g., itaconic anhydride, maleic anhydride), and combinations thereof. In some examples, the carboxylic acid comprises acrylic acid. In some examples, the carboxylic acid consists of acrylic acid.

The copolymer can, for example, be derived from greater than 0% by weight of the carboxylic acid, carboxylic acid anhydride, or a combination thereof, based on the total monomer weight (e.g., 0.1% or more, 0.25% or more, 0.5% or more, 0.75% or more, 1% or more, 1.5% or more, 2% or more, 2.5% or more, 3% or more, 3.5% or more, 4% or more, 4.5% or more, 5% or more, 6% or more, 7% or more, or 8% or more). In some examples, the copolymer can be derived from 10% or less by weight of the carboxylic acid, carboxylic acid anhydride, or a combination thereof, based on the total monomer weight (e.g., 9% or less, 8% or less, 7% or less, 6% or less, 5% or less, 4.5% or less, 4% or less, 3.5% or less, 3% or less, 2.5% or less, 2% or less, 1.5% or less, 1% or less, 0.75% or less, or 0.5% or less). The amount of carboxylic acid, carboxylic acid anhydride, or a combination thereof the copolymer is derived from can range from any of the minimum values described above to any of the maximum values described above. For example, the copolymer can be derived from greater than 0% to 10% by weight carboxylic acid, carboxylic acid anhydride, or a combination thereof, based on the total monomer weight (e.g., from greater than 0% to 9%, from greater than 0% to 8%, from greater than 0% to 7%, from greater than 0% to 6%, from greater than 0% to 5%, from greater than 0% to 4%, from 0.1% to 3%, from 0.25% to 2.5%, or from 0.5% to 2%).

As disclosed herein, the copolymer is derived from an organosilane. The organosilane can be represented by the formula $(R^1)—(Si)—(OR^2)_3$, wherein $R^1$ is a $C_1$-$C_8$ substituted or unsubstituted alkyl or a $C_1$-$C_8$ substituted or unsubstituted alkene and $R^2$, which are the same or different, each is a $C_1$-$C_8$ substituted or unsubstituted alkyl group. In some examples, the organosilane comprises a vinyl silane. Exemplary organosilanes can include vinyltrimethoxysilane, vinyltriethoxysilane, vinyl tris(2-methoxyethoxysilane), vinyl triisopropoxysilane, (meth)acryloyloxypropyltrimethoxysilane, γ-(meth)acryloxypropyltrimethoxysilane, γ-(meth)acryloxypropyltriethoxysilane, or a mixture thereof. In some examples, the organosilane comprises vinyltrimethoxysilane, vinyltriethoxysilane, vinyl tris(2-methoxyethoxysilane), vinyl triisopropoxysilane, gamma-methacryloxypropyltrimethoxy silane, or combinations thereof. In some examples, the organosilane comprises vinyltriethoxysilane. In some examples, the organosilane consists of vinylethoxysilane.

The copolymer can, for example, be derived from 0.05% or more by weight of the organosilane, based on the total monomer weight (e.g., 0.1% or more, 0.2% or more, 0.3% or more, 0.4% or more, 0.5% or more, 0.6% or more, 0.7% or more, 0.8% or more, 0.9% or more, 1% or more, 1.1% or more, 1.2% or more, 1.3% or more, 1.4% or more, or 1.5% or more). In some examples, the copolymer can be derived from 2% or less by weight of the organosilane, based on the total monomer content (e.g., 1.9% or less, 1.8% or less, 1.7% or less, 1.6% or less, 1.5% or less, 1.4% or less, 1.3% or less, 1.2% or less, 1.1% or less, 1% or less, 0.9% or less, 0.8% or less, 0.7% or less, 0.6% or less, or 0.5% or less). The amount of organosilane the copolymer is derived form can range from any of the minimum values described above to any of the maximum values described above. For example, the copolymer can be derived from 0.05% to 2% by weight of the organosilane, based on the total monomer weight (e.g., from 0.05% to 1.5%, from 0.05% to 1%, from 0.05% to 0.9%, from 0.05% to 0.8%, from 0.05% to 0.7%, from 0.05% to 0.6%, or from 0.1% to 0.5%).

The copolymer can be derived from other monomers. For example, the copolymer can be derived from vinyl esters of branched mono-carboxylic acids having a total of 8 to 12 carbon atoms in the acid residue moiety and 10 to 14 total carbon atoms such as, vinyl 2-ethylhexanoate, vinyl neo-nonanoate, vinyl neo-decanoate, vinyl neo-undecanoate, vinyl neo-dodecanoate and mixtures thereof, and copolymerizable surfactant monomers (e.g., those sold under the trademark ADEKA REASOAP).

In addition to the monomers, the copolymer is formed in the presence of maltodextrin. The maltodextrin can have, for example, a dextrose equivalent (DE) of 10 or more (e.g., 10.5 or more, 11 or more, 11.5 or more, 12 or more, 12.5 or more, 13 or more, 13.5 or more, 14 or more, 14.5 or more, 15 or more, 16 or more, 17 or more, 18 or more, 19 or more, 20 or more, 21 or more, 22 or more, 23 or more, 24 or more, 25 or more, 30 or more, or 35 or more). In some examples, the maltodextrin can have a DE of 50 or less (e.g., 45 or less, 40 or less, 35 or less, 30 or less, 25 or less, 24 or less, 23 or less, 22 or less, 21 or less, 20 or less, 19 or less, 18 or less, 17 or less, 16 or less, 15 or less, 14.5 or less, 14 or less, 13.5 or less, 13 or less, or 12.5 or less). The DE value of the maltodextrin can range from any of the minimum values described above to any of the maximum values described above. For example, the maltodextrin can have a DE of from 10 to 50 (e.g., from 15 to 50, from 10 to 40, from 10 to 35, from 12.5 to 25, or from 15 to 20). The DE value can be determined in accordance with the Lane and Eynon test method (International Standard ISO 5377:1981).

The weight average molecular weight ($M_w$) of the maltodextrin can be, for example, 3,000 Daltons or more (e.g., 3,500 or more, 4,000 or more; 4,500 or more; 5,000 or more; 6,000 or more, 7,000 or more; 8,000 or more; 9,000 or more; 10,000 or more; 11,000 or more; 12,000 or more; 13,000 or more; 14,000 or more; 15,000 or more; 16,000 or more; or 17,000 or more). In some examples, the weight average molecular weight ($M_w$) of the maltodextrin can be 20,000

Daltons or less (e.g., 19,000 or less; 18,000 or less; 17,000 or less; 16,000 or less; 15,000 or less; 14,000 or less; 13,000 or less; 12,000 or less; 11,000 or less; 10,000 or less; 9,000 or less; 8,000 or less; 7,000 or less; 6,000 or less; or 5,000 or less). The weight average molecular weight ($M_w$) of the maltodextrin can range from any of the minimum values described above to any of the maximum values described above. For example, the weight average molecular weight ($M_w$) of the maltodextrin can be from 3,000 to 20,000 Daltons (e.g., from 3,000 to 19,000; from 4,000 to 19,000; from 4,500 to 18,000; from 5,000 to 17,000; or from 8,000 to 14,000). The weight average molecular weight ($M_w$) of the maltodextrin can be determined by size exclusion chromatography.

In some examples, the maltodextrin can be soluble in water at room temperature in an amount of greater than about 40% by weight (e.g., 45% or more, 50% or more, 55% or more, 60% or more, 65% or more, 70% or more, 75% or more, 80% or more, 85% or more, 90% or more, or 95% or more). In some examples, the maltodextrin can be completely soluble in water at room temperature. The maltodextrin is generally degraded starches whose degradation is effected by heating with or without addition of chemicals, it being possible to recombine degradation fragments under the degradation conditions to form new bonds which were not present in this form in the original starch. Roast dextrins such as white and yellow dextrins that are prepared by heating moist-dry starch, usually in the presence of small amounts of acid, are less preferred. The maltodextrin can be prepared as described in Guinther Tegge, Starke and Starkederivate, Behr's Verlag, Hamburg 1984, p. 173 and p. 220 ff. and in EP 441 197.

The maltodextrin can be can be prepared from any native starches, such as cereal starches (e.g. corn, wheat, rice or barley), tuber and root starches (e.g. potatoes, tapioca roots or arrowroot) or sago starches. The maltodextrin can also have a bimodal molecular weight distribution and can have a weight average molecular weight as described above. The maltodextrin can have a nonuniformity U (defined as the ratio between the weight average weight $M_w$ and the number average molecular weight $M_n$) that characterizes the molecular weight distribution in the range from 6 to 12, from 7 to 11 or from 8 to 10. The proportion by weight of maltodextrin having a molecular weight of below 1000 can be from 10% to 70% by weight, or 20 to 40% by weight.

In some examples, the maltodextrin can be chemically modified such as by etherification or esterification. The chemical modification can also be carried out in advance on a starting starch before its degradation. Esterifications are possible using both inorganic and organic acids, or anhydrides or chlorides thereof. Phosphated and acetylated degraded starches can also be used. The most common method of etherification is treatment with organohalogen compounds, epoxides or sulfates in aqueous alkaline solution. The ethers can be alkyl ethers, hydroxyalkyl ethers, carboxyalkyl ethers and allylethers.

The copolymer can, for example, comprise 1% or more by weight of the maltodextrin, based on the total monomer weight (e.g., 2% or more, 3% or more, 4% or more, 5% or more, 6% or more, 7% or more, 8% or more, 9% or more, 10% or more, 15% or more, 20% or more, 25% or more, or 30% or more). In some examples, the copolymer can comprise 40% or less by weight of the maltodextrin (e.g., 35% or less, 30% or less, 25% or less, 20% or less, 15% or less, 10% or less, 9% or less, 8% or less, 7% or less, 6% or less, or 5% or less). The amount of the maltodextrin the copolymer comprises can range from any of the minimum values described above to any of the maximum values described above. For example, the copolymer can comprise from 1% to 40% by weight of the maltodextrin (e.g., from 1% to 30%, from 5% to 40%, from 5% to 35%, from 5% to 30%, from 5% to 25%, from 7% to 40%, from 7% to 35%, from 7% to 30%, from 7% to 25%, from 8% to 30%, from 8% to 25%, or from 8% to 20%).

In some examples, the copolymer can be polymerized in the presence of a surfactant. The surfactant can include nonionic surfactants, anionic surfactants, cationic surfactants, amphoteric surfactants, or a mixture thereof. In some examples, the surfactant can comprise a non-ionic surfactant and an anionic surfactant. In some examples, the surfactant can include a copolymerizable surfactant. In some examples, the surfactant can include oleic acid surfactants, alkyl sulfate surfactants, alkyl aryl disulfonate surfactants, sulfonic acid surfactants, or alkylbenzene sulfonic acid or sulfonate surfactants. Exemplary surfactants can include sodium vinyl sulfate, 2-acrylamido-2-methylpropane sulfonic acid (AMPS), ammonium lauryl sulfite, sodium laureth-1 sulfate, sodium laureth-2-sulfate, and the corresponding ammonium salts, triethylamine lauryl sulfate, triethylamine laureth sulfate, triethanolamine lauryl sulfate, triethanolamine laureth sulfate, monoethanolamine lauryl sulfate, monoethanolamine laureth sulfate, diethanolamine lauryl sulfate, diethanolamine laureth sulfate, lauric monoglyceride sodium sulfate, sodium lauryl sulfate, sodium laureth sulfate, potassium lauryl sulfate, potassium laureth sulfate, sodium lauryl sarcosinate, sodium lauroyl sarcosinate, lauryl sarcosine, cocyl sarcosine, ammonium cocoyl sulfate, ammonium lauroyl sulfate, sodium cocoyl sulfate, sodium lauroyl sulfate, potassium cocoyl sulfate, monoethanolamine cocoyl sulfate, monoethanolamine lauryl sulfate, sodium tridecyl benzene sulfonate, sodium dodecyl benzene sulfonate, C12 (branched) sodium diphenyl oxide disulfonate, or combinations thereof. Examples of commercially available surfactants include Calfoam® ES-303 (a sodium laureth sulfate), Calfoam SLS 30, and Calfax® DB-45 (a sodium dodecyl diphenyl oxide disulfonate), available from Pilot Chemical Company (Cincinnati, Ohio); Disponil SDS; Disponil FES; Disponil AFX 4030; Polystep LAS-40; Polystep B-19; Polystep B-29; Polystep A-18; Steol CS-230; Bio-Terge AS-40; Tergitol 15-S-40; Tergitol 15-S-20; Aerosol A-102; Aerosol MA-80-1; copolymerizable surfactants (e.g., those sold under the trademark ADEKA REASOAP); or combinations thereof. In some examples, the copolymerizable surfactant comprises sodium vinyl sulfonate, 2-acrylamido-2-methylpropane sulfonic acid (AMPS), or a combination thereof.

The amount of the surfactant employed can be 0.1% or more based on the total amount of the monomers to be polymerized (e.g., 0.2% or more, 0.3% or more, 0.4% or more, 0.5% or more, 1% or more, 1.5% or more, 2% or more, 2.5% or more, 3% or more, 3.5% or more, or 4% or more). In some examples, the amount of surfactant employed can be 5% or less based on the total amount of the monomers to be polymerized (e.g., 4.5% or less, 4% or less, 3.5% or less, 3% or less, 2.5% or less, 2% or less, 1.5% or less, 1% or less, or 0.5% or less). The amount of the surfactant employed can range from any of the minimum values described above to any of the maximum values described above. For example, the amount of the surfactant employed can be from 0.1 to 5%, based on the total amount of the monomers to be polymerized (e.g., from 0.1% to 2.5%, from 2.5% to 5%, from 0.1% to 1%, from 1% to 2%, from 2% to 3%, from 3% to 4%, from 4% to 5%, or from 0.5% to 4.5%).

As described herein, the monomers in the copolymer can, in some examples, be polymerized in the presence of a chain transfer agent. A "chain transfer agent" as used herein refers to chemical compounds that are useful for controlling the molecular weights of polymers, for reducing gelation when polymerizations and copolymerizations involving diene monomers are conducted, and/or for preparing polymers and copolymers with useful chemical functionality at their chain ends. The chain transfer agent reacts with a growing polymer radical, causing the growing chain to terminate while creating a new reactive species capable of initiating polymerization. The phrase "chain transfer agent" is used interchangeably with the phrase "molecular weight regulator."

Suitable chain transfer agents for use during polymerization of the copolymers disclosed herein can include compounds having a carbon-halogen bond, a sulfur-hydrogen bond, a silicon-hydrogen bond, or a sulfur-sulfur bond; an allyl alcohol, or an aldehyde. In some examples, the chain transfer agents contain a sulfur-hydrogen bond, and are known as mercaptans. In some examples, the chain transfer agent can include $C_3$-$C_{20}$ mercaptans. Specific examples of the chain transfer agent can include octyl mercaptan such as n-octyl mercaptan and t-octyl mercaptan, decyl mercaptan, tetradecyl mercaptan, hexadecyl mercaptan, dodecyl mercaptan such as n-dodecyl mercaptan and t-dodecyl mercaptan, tert-butyl mercaptan, mercaptoethanol such as β-mercaptoethanol, 3-mercaptopropanol, mercaptopropyltrimethoxysilane, tert-nonyl mercaptan, test-dodecyl mercaptan, 6-mercaptomethyl-2-methyl-2-octanol, 4-mercapto-3-methyl-1-butanol, methyl-3-mercaptopropionate, butyl-3-mercaptopropionate, i-octyl-3-mercaptopropionate, i-decyl-3-mercaptopropionate, dodecyl-3-mercaptopropionate, octadecyl-3-mercaptopropionate, and 2-phenyl-1-mercapto-2-ethanol. Other suitable examples of chain transfer agents that can be used during polymerization of the copolymers include thioglycolic acid, methyl thioglycolate, n-butyl thioglycolate, i-octyl thioglycolate, dodecyl thioglycolate, octadecyl thioglycolate, ethylacrylic esters, terpinolene. In some examples, the chain transfer agent can include tert-dodecyl mercaptan.

The amount of the chain transfer agent employed can be 0.05% or more based on the total amount of the monomers to be polymerized (e.g., 0.1% or more, 0.15% or more, 0.2% or more, 0.25% or more, 0.3% or more, 0.35% or more, 0.4% or more, 0.45% or more. 0.5% or more, 0.55% or more, 0.6% or more, 0.65% or more, 0.7% or more, 0.75% or more, 0.8% or more, 0.85% or more, or 0.9% or more). In some examples, the amount of the chain transfer agent employed can be 1% or less based on the total amount of the monomers to be polymerized (e.g., 0.95% or less, 0.9% or less, 0.85% or less, 0.8% or less, 0.75% or less, 0.7% or less, 0.65% or less, 0.6% or less, 0.55% or less, 0.5% or less, 0.45% or less, 0.4% or less, 0.35% or less, 0.3% or less, 0.25% or less, 0.2% or less, 0.15% or less, or 0.1% or less). The amount of chain transfer agent employed can range from any of the minimum values described above to any of the maximum values described above. For example, the amount of the chain transfer agent employed can be from 0.05% to 1% based on the total amount of the monomers to be polymerized (e.g., from 0.05% to 0.5%, from 0.5% to 1%, from 0.05% to 0.3%, from 0.3% to 0.6%, 0.6% to 1%, or from 0.1% to 0.9%).

In some examples, the monomers can be polymerized in the presence of a crosslinker, such as triallyl cyanurate, triallyl isocyanurate, diallyl phthalate, butane dioldiacrylate, diallyl maleate, diallyl fumarate, or a combination thereof. The amount of crosslinker employed can be 0.05% or more based on the total amount of the monomers to be polymerized (e.g., 0.1% or more, 0.2% or more, 0.3% or more, 0.4% or more, 0.5% or more, 0.6% or more, 0.7% or more, 0.8% or more, 0.9% or more, 1% or more, 1.1% or more, 1.2% or more, 1.3% or more, 1.4% or more, 1.5% or more, 1.6% or more, 1.7% or more, or 1.8% or more). In some examples, the amount of crosslinker employed can be 2% or less based on the total amount of the monomers to be polymerized (e.g., 1.9% or less, 1.8% or less, 1.7% or less, 1.6% or less, 1.5% or less, 1.4% or less, 1.3% or less, 1.2% or less, 1.1% or less, 1% or less, 0.9% or less, 0.8% or less, 0.7% or less, 0.6% or less, 0.5% or less, 0.4% or less, 0.3% or less, or 0.2% or less). The mount of crosslinker employed can range from any of the minimum values described above to any of the maximum values described above. For example, the amount of crosslinker employed can be from 0.05% to 2% based on the total amount of monomers to be polymerized (e.g., from 0.05% to 1%, from 1% to 2%, from 0.05% to 0.5%, from 0.5% to 1%, from 1% to 1.5%, from 1.5% to 2%, or from 0.1% to 1.9%).

The copolymers described herein can have a glass-transition temperature ($T_g$) and/or a $T_g$ as measured by differential scanning calorimetry (DSC) using the mid-point temperature using the method described, for example, in ASTM 3418/82. The theoretical glass transition temperature or "theoretical $T_g$" of the copolymer refers to the estimated $T_g$ calculated using the Fox equation. The Fox equation can be used to estimate the glass transition temperature of a polymer or copolymer as described, for example, in L. H. Sperling, "Introduction to Physical Polymer Science", $2^{nd}$ Edition, John & Sons, New York, p. 357 (1992) and T. G. Fox, *Bull. Am. Phys. Soc,* 1, 123 (1956), both of which are incorporated herein by reference. For example, the theoretical glass transition temperature of a copolymer derived from monomers a, b, . . . , and i can be calculated according to the equation below $$\frac{1}{T_g} = \frac{w_a}{T_{ga}} + \frac{w_b}{T_{gb}} + \ldots + \frac{w_i}{T_{gi}}$$

where $w_a$ is the weight fraction of monomer a in the copolymer, $T_{ga}$ is the glass transition temperature of a homopolymer of monomer a, $w_b$ is the weight fraction of monomer b in the copolymer, $T_{gb}$ is the glass transition temperature of a homopolymer of monomer b, $w_i$ is the weight fraction of monomer i in the copolymer, $T_{gi}$ is the glass transition temperature of a homopolymer of monomer i, and $T_g$ is the theoretical glass transition temperature of the copolymer derived from monomers a, b, . . . , and i.

In some examples, the copolymers described herein can have a measured $T_g$ of −35° C. or more, as measured by differential scanning calorimetry (DSC) using the mid-point temperature (e.g., −25° C. or more, −20° C. or more, −15° C. or more, −10° C. or more, −5° C. or more, 0° C. or more, 5° C. or more, 10° C. or more, 15° C. or more, 20° C. or more, or 25° C. or more). In some examples, the copolymers described herein can have a measured $T_g$ of 30° C. or less, as measured by differential scanning calorimetry (DSC) using the mid-point temperature (e.g., 25° C. or less, 20° C. or less, 15° C. or less, 10° C. or less, 5° C. or less, 0° C. or less, −5° C. or less, −10° C. or less, −15° C. or less, −20° C. or less, or −25° C. or less). The measured $T_g$ of the copolymer can range from any of the minimum values described above to any of the maximum values described above. For example, the copolymers described herein can have a measured $T_g$ of from −35° C. to 30° C., as measured by differential scanning calorimetry (DSC) using the midpoint temperature (e.g., from −35° C. to 0° C., from 0° C. to 30° C., from −35° C., to −20° C., from −20° C. to −5° C., from −5° C. to 10° C., from 10° C. to 30° C., or from −25° C. to 30° C.).

The copolymer can be provided as an aqueous dispersion. The aqueous dispersion can include, as the disperse phase, the copolymer dispersed in an aqueous dispersion medium or aqueous phase. In some examples, aqueous dispersion can comprise water and the copolymer.

In some examples, the aqueous dispersion can have an overall solids content of 40% or more (e.g., 45% or more, 50% or more, 55% or more, 60% or more, 65% or more, or 70% or more). In some examples, the aqueous dispersion can have an overall solids content of 75% or less (e.g., 70% or less, 65% or less, 60% or less, 55% or less, or 50% or less). The overall solids content of the aqueous dispersion can range from any of the minimum values described above to any of the maximum values described above. For example, the aqueous dispersion can have an overall solids content of from 40% to 75% (e.g., from 40% to 55%, from 45% to 75%, from 50% to 75%, from 55% to 75%, or from 60% to 75%). The overall solids content can be measured in an oven by water evaporation.

The aqueous dispersion can comprise a plurality of copolymer particles having a volume average particle size. The plurality of copolymer particles can have an average particle size of 80 nanometers (nm) or more (e.g., 90 nm or more, 100 nm or more, 110 nm or more, 120 nm or more, 130 nm or more, 140 nm or more, 150 nm or more, 160 nm or more, 170 nm or more, 180 nm or more, 190 nm or more, 200 nm or more, 225 nm or more, 250 nm or more, 275 nm or more, 300 nm or more, 325 nm or more, 350 nm or more, 375 nm or more, 400 nm or more, 425 nm or more, or 450 nm or more). In some examples, the plurality of copolymer particles can have a volume average particle size of 500 nm or less (e.g., 475 nm or less, 450 nm or less, 425 nm or less, 400 nm or less, 375 nm or less, 350 nm or less, 325 nm or less, 300 nm or less, 275 nm or less, 250 nm or less, 225 nm or less, 200 nm or less, 190 nm or less, 180 nm or less, 170 nm or less, 160 nm or less, 150 nm or less, 140 nm or less, 130 nm or less, 120 nm or less, 110 nm or less, or 100 nm or less). The volume average particle size of the plurality of copolymer particles can range from any of the minimum values described above to any of the maximum values described above. For example, the plurality of copolymer particles can have a volume average particle size of from 80 nm to 500 nm (e.g., from 80 nm to 300 nm, from 300 nm to 500 nm, from 80 nm to 175 nm, from 175 nm to 275 nm, from 275 nm to 375 nm, from 375 nm to 500 nm, or from 100 nm to 400 nm). The particle size can be determined using dynamic light scattering measurements using the Nanotrac Wave II Q available from Microtrac Inc., Montgomeryville, Pa.

The aqueous dispersion comprising the copolymer can be used in adhesive formulations.

The adhesive formulation can be stable during storage. For example, the adhesive formulation can have a minimum viscosity of 5,000 Cp or more (e.g., 5,500 Cp or more; 6,000 Cp or more; 6,500 Cp or more; or 7,000 Cp or more) and does not fluctuate more than 1000 Cp over a 1 day period as measured by a #5 spindle at 20 RPM on a Brookfield viscometer at a solids content of 75-85 wt %.

The adhesive formulations can further include one or more additives. For example, the adhesive formulations can further comprise clay, delaminated clay, titanium dioxide, calcium carbonate, or a combination thereof. Examples of additional additives include, but are not limited to, one or more coalescing aids/agents (coalescents), plasticizers, defoamers, additional surfactants, pH modifying agents, fillers, pigments, dispersing agents, thickeners, biocides, lubricants (e.g., calcium stearate), flame retardants, stabilizers, corrosion inhibitors, flattening agents, optical brighteners and fluorescent additives, curing agents, flow agents, wetting or spreading agents, leveling agents, hardeners, thixotropic agents, freeze store stability additives, ultraviolet light stabilizers, or combinations thereof. In some examples, the additive can be added to impart certain properties to the adhesive formulation such as smoothness, whiteness, increased density or weight, decreased porosity, increased opacity, flatness, glossiness, decreased blocking resistance, barrier properties, viscosity, tuft bind performance, peel/fuzz properties, and the like.

Suitable coalescing aids, which aid in film formation during drying, include ethylene glycol monomethyl ether, ethylene glycol monobutyl ether, ethylene glycol monoethyl ether acetate, ethylene glycol monobutyl ether acetate, diethylene glycol monobutyl ether, diethylene glycol monoethyl ether acetate, dipropylene glycol monomethyl ether, propylene glycol n-butyl ether, dipropylene glycol n-butyl ether, 2,2,4-trimethyl-1,3-pentanediol monoisobutyrate, or combinations thereof.

Defoamers serve to minimize frothing during mixing and/or application of the adhesive component. Suitable defoamers include organic defoamers such as mineral oils, silicone oils, and silica-based defoamers. Exemplary silicone oils include polysiloxanes, polydimethylsiloxanes, polyether modified polysiloxanes, or combinations thereof. Exemplary defoamers include BYK®-035, available from BYK USA Inc., the TEGO® series of defoamers, available from Evonik Industries, the DREWPLUS® series of defoamers, available from Ashland Inc., and FOAMASTER® NXZ, available from BASF Corporation.

Plasticizers can be added to the compositions to reduce the glass transition temperature ($T_g$) of the compositions below that of the drying temperature to allow for good film formation. Suitable plasticizers include diethylene glycol dibenzoate, dipropylene glycol dibenzoate, tripropylene glycol dibenzoate, butyl benzyl phthalate, or a combination thereof. Exemplary plasticizers include phthalate based plasticizers.

Pigments that can be included in the compositions can be selected from $TiO_2$ (in both anatase and rutile forms), clay (aluminum silicate), $CaCO_3$ (in both ground and precipitated forms), aluminum oxide, silicon dioxide, magnesium oxide, talc (magnesium silicate), barytes (barium sulfate), zinc oxide, zinc sulfite, sodium oxide, potassium oxide and mixtures thereof. Examples of commercially available titanium dioxide pigments are KRONOS® 2101, KRONOS® 2310, available from Kronos WorldWide, Inc., TI-PURE® R-900, available from DuPont, or TIONA® AT1 commercially available from Millennium Inorganic Chemicals. Titanium dioxide is also available in concentrated dispersion form. An example of a titanium dioxide dispersion is KRONOS® 4311, also available from Kronos WorldWide, Inc. Suitable pigment blends of metal oxides are sold under the marks MINEX® (oxides of silicon, aluminum, sodium and potassium commercially available from Unimin Specialty Minerals), CELITE® (aluminum oxide and silicon dioxide commercially available from Celite Company), and ATOMITE® (commercially available from Imerys Performance Minerals). Exemplary fillers also include clays such as attapulgite days and kaolin clays including those sold under the ATTAGEL® and ANSILEX® marks (commercially available from BASF Corporation). Additional fillers include nepheline syenite, (25% nepheline, 55% sodium feldspar, and 20% potassium feldspar), feldspar (an aluminosilicate), diatomaceous earth, calcined diatomaceous earth, talc (hydrated magnesium silicate), aluminosilicates, silica (silicon dioxide), alumina (aluminum oxide), alumina trihydrate (ATM), mica (hydrous aluminum potassium silicate), pyrophyllite (aluminum silicate hydroxide), perlite, baryte (barium sulfate), Wollastonite (calcium metasilicate), and combinations thereof. More preferably, the at least one filler includes $TiO_2$, $CaCO_3$, and/or a clay. In some examples, the adhesive formulation further comprises a filler comprising alumina trihydrate (ATH), $CaCO_3$, or a combination thereof. The fillers can, for example, provide desired performance relating to dimensional stability, Tuft Bind strength, and/or shedding/fuzz properties of a carpet tile comprising the adhesive formulation.

Examples of suitable thickeners include hydrophobically modified ethylene oxide urethane (HEUR) polymers, hydrophobically modified alkali soluble emulsion (HASE) polymers, hydrophobically modified hydroxyethyl celluloses (HMHECs), hydrophobically modified polyacrylamide, and combinations thereof. HEUR polymers are linear reaction products of diisocyanates with polyethylene oxide end-capped with hydrophobic hydrocarbon groups. HASE polymers are homopolymers of (meth)acrylic acid, or copolymers of (meth)acrylic acid, (meth)acrylate esters, or maleic acid modified with hydrophobic vinyl monomers. HMHECs include hydroxyethyl cellulose modified with hydrophobic alkyl chains. Hydrophobically modified polyacrylamides include copolymers of acrylamide with acrylamide modified with hydrophobic alkyl chains (N-alkyl acrylamide). Other suitable thickeners that can be used in the adhesive formulations can include acrylic copolymer dispersions sold under the STEROCOLL™ and LATEKOLL™ trademarks from BASF Corporation, Florham Park, N.J.; urethanes thickeners sold under the RHEOVIS™ trademark (e.g., Rheovis PU 1214); hydroxyethyl cellulose; guar gum; carrageenan; xanthan; acetan; konjac; mannan; xyloglucan; and mixtures thereof. The thickeners can be added to the composition formulation as an aqueous dispersion or emulsion, or as a solid powder. Thickeners can be added to the adhesive formulation to control the viscosity, which can influence penetration relating to tuft bind performance and peel/fuzz properties of the adhesive formulation.

Additional surfactants can, for example, be used to control the froth properties relating to penetration of the adhesive formulation and weight control of the adhesive formulation. Surfactant types and levels can influence the rheology of the adhesive formulation to determine such properties.

Examples of suitable pH modifying agents include bases such as sodium hydroxide, potassium hydroxide, amino alcohols, monoethanolamine (MEA), diethanolamine (DEA), 2-(2-aminoethoxy)ethanol, diisopropanolamine (DIPA), 1-amino-2-propanol (AMP), ammonia, and combinations thereof. The pH of the dispersion can be 3 or more (e.g., 4 or more, 5 or more, 6 or more, 7 or more, or 8 or more). In some examples, the pH of the dispersion can be 10 or less (e.g., 9 or less, 8 or less, 7 or less, 6 or less, or 5 or less). The pH of the dispersion can range from any of the minimum values described above to any of the maximum values described above. For example, the pH of the dispersion can be from 3 to 10 (e.g., from 3 to 7, from 7 to 10, from 3 to 5, from 5 to 7, from 4 to 9, or from 5 to 8).

Suitable biocides can be incorporated to inhibit the growth of bacteria and other microbes in the adhesive formulation during storage. Exemplary biocides include 2-[(hydroxymethyl)amino]ethanol, 2-[(hydroxymethyl)amino]2-methyl-1-propanol, o-phenylphenol, sodium salt, 1,2-benzisothiazolin-3-one, 2-methyl-4-isothiazolin-3-one (MIT), 5-chloro-2-methyl-4-isothiazolin-3-one (CIT), 2-octyl-4-isothiazolin-3-one (OIT), 4,5-dichloro-2-n-octyl-3-isothiazolone, as well as acceptable salts and combinations thereof. Suitable biocides also include biocides that inhibit the growth of mold, mildew, and spores thereof in the adhesive. Examples of mildewcides include 2-(thiocyanomethylthio)benzothiazole, 3-iodo-2-propynyl butyl carbamate, 2,4,5,6-tetrachloroisophthalonitrile, 2-(4-thiazolyl)benzimidazole, 2-N-octyl-4-isothiazolin-3-one, diiodomethyl p-tolyl sulfone, as well as acceptable salts and combinations thereof. In certain examples, the adhesive formulation contains 1,2-benzisothiazolin-3-one or a salt thereof. Biocides of this type include PROXEL® BD20, commercially available from Arch Chemicals, Inc. The biocide can alternatively be applied as a film to the adhesive and a commercially available film-forming biocide is Zinc Omadine® commercially available from Arch Chemicals, Inc.

Exemplary co-solvents and humectants include ethylene glycol, propylene glycol, diethylene glycol, and combinations thereof. Exemplary dispersants can include sodium polyacrylates in aqueous solution such as those sold under the DARVAN trademark by R.T. Vanderbilt Co., Norwalk, Conn.

Also disclosed herein are blends comprising the copolymers described herein and a second (co)polymer. For example, the second (co)polymer can comprise an acrylic (co)polymer, a carboxylated or non-carboxylated styrene-butadiene (co)polymer, or a combination thereof. The copolymers described herein can be present in an amount of 15% to 95%, 20% to 90%, 25% to 85%, 30% to 80%, 35% to 75%, 40% to 70%, 45% to 65%, or 50% to 60%, by weight, based on the total amount of polymers in the compositions described herein.

The adhesive formulations can be applied to a carpet tile. As such, also disclosed herein are carpet tiles having a surface coated with the adhesive formulations disclosed herein. The surface can, for example, a backing of the carpet tile. The backing can, for example, comprise polyvinylchloride (PVC).

The adhesive composition can be applied to a surface by any suitable coating technique, including spraying, rolling, brushing, or spreading. The adhesive formulation can be applied in a single coat, or in multiple sequential coats (e.g., in two coats or in three coats) as required for a particular application. The adhesive formulation can be applied as a layer having an application weight of 10 ounces per square yard ($oz/yd^2$) or more (e.g., 11 $oz/yd^2$ or more, 12 $oz/yd^2$ or more, 13 $oz/yd^2$ or more, 14 $oz/yd^2$ or more, 15 $oz/yd^2$ or more, 16 $oz/yd^2$ or more, 17 $oz/yd^2$ or more, 18 $oz/yd^2$ or more, 19 $oz/yd^2$ or more, 20 $oz/yd^2$ or more, 21 $oz/yd^2$ or more, or 22 $oz/yd^2$ or more). In some examples, the adhesive formulation can be applied as a layer having an application weight of 24 $oz/yd^2$ or less (e.g., 23 $oz/yd^2$ or less, 22 $oz/yd^2$ or less, 21 $oz/yd^2$ or less, 20 $oz/yd^2$ or less, 19 $oz/yd^2$ or less, 18 $oz/yd^2$ or less, 17 $oz/yd^2$ or less, 16 $oz/yd^2$ or less, 15 $oz/yd^2$ or less, 14 $oz/yd^2$ or less, 13 $oz/yd^2$ or less, or 12 $oz/yd^2$ or less). The application weight of the layer of adhesive formulation can range from any of the minimum values described above to any of the maximum values described above. For example, the adhesive formulation can be applied as a layer having an application weight of from 10 $oz/yd^2$ to 24 $oz/yd^2$ (e.g., from 10 $oz/yd^2$ to 17 $oz/yd^2$, from 17 $oz/yd^2$ to 24 $oz/yd^2$, from 10 $oz/yd^2$ to 12 $oz/yd^2$, from 12 oz/yd² to 14 oz/yd², from 14 oz/yd² to 16 oz/yd² from 16 oz/yd² to 18 oz/yd², from 18 oz/yd² to 20 oz/yd², from 20 oz/yd² to 22 oz/yd², from 22 oz/yd² to 24 oz/yd², or from 11 oz/yd² to 23 oz/yd²).

In some examples, the adhesive formulation on the carpet tile can have a dry tuft bind strength and a wet tuft bind strength, wherein the wet tuft bind strength is 60% or more of the dry tuft strength (e.g., 61% or more, 62% or more, 63% or more, 64% or more, 65% or more, 66% or more, or 67% or more). In some examples, the adhesive formulation on the carpet tile can have a wet tuft bind strength that is 70% or less of the dry tuft bind strength (e.g., 69% or less, 68% or less, 67% or less, 66% or less, 65% or less, 64% or less, or 63% or less). The wet tuft bind strength can range from any of the minimum values described above to any of the maximum values described above. For example, the adhesive formulation on the carpet tile can have a wet tuft bind strength that is 60% to 70% of the dry tuft bind strength (e.g., from 60% to 65%, from 65% to 70%, or from 63% to 67%). Dry and wet tuft are measured using an Instron with head traveling 12 inches/min and are reported as lb-force/tuft. Wet strength is measured after complete immersion in water.

In some examples, the carpet tile with the adhesive formulation applied thereto can pass the British spill test. The British spill test involves poring 100 ml of a blue dye solution on the face of the carpet and after 24 hours a visual inspection is made as to whether dye is seen on paper placed on the opposite face of the carpet (back face). If no dye is seen on the paper placed on the back face of the carpet after 24 hours, the carpet is said to have passed the British spill test.

The copolymers and compositions disclosed herein can be prepared by any polymerization method known in the art. Suitable methods are described in U.S. Pat. No. 6,080,813, which is hereby incorporated by reference in its entirety. Although the copolymers can be prepared as block copolymers, they are preferably prepared as random copolymers.

In some examples, the copolymers disclosed herein are prepared by a dispersion, a mini-emulsion, or an emulsion polymerization. The copolymers disclosed herein can be prepared, for instance, by polymerizing the vinyl acetate; acrylate monomer having a $T_g$ of −30° C. or less; carboxylic acid, carboxylic acid anhydride, or a combination thereof and organosilane; in the presence of maltodextrin. In some examples, the copolymers disclosed herein can be prepared using free-radical aqueous emulsion polymerization. In some examples, the polymerization medium is an aqueous medium. The aqueous medium can include water alone or a mixture of water and water-miscible liquids, such as methanol. In some examples, water is used alone.

The emulsion polymerization can be carried out either as a batch, semi-batch, or continuous process. In some examples, a portion of the monomers can be heated to the polymerization temperature and partially polymerized, and the remainder of the polymerization batch can be subsequently fed to the polymerization zone continuously, in steps or with superposition of a concentration gradient. The process can use a single reactor or a series of reactors as would be readily understood by those skilled in the art. For example, a review of heterophase polymerization techniques is provided in M. Antonelli and K. Tauer, Macromol. Chem. Phys. 2003, vol. 204, p 207-19.

A copolymer dispersion can be prepared by first charging a reactor with water, the monomers, the maltodextrin, and optionally additional monomers, chain transfer agent, surfactant, etc. A seed latex, though optional, can be included in the reactor to help initiate polymerization and helps produce a polymer having a consistent particle size. Any seed latex appropriate for the specific monomer reaction can be used such as a polystyrene seed. The initial charge can also include a chelating or complexing agent such as ethylenediamine tetraacetic acid (EDTA). Other compounds such as buffers can be added to the reactor to provide the desired pH for the emulsion polymerization reaction. For example, bases or basic salts such as KOH or tetrasodium pyrophosphate can be used to increase the pH whereas acids or acidic salts can be used to decrease the pH. The initial charge can then be heated to a temperature at or near the polymerization temperature.

The monomers can, for example, be polymerized at a polymerization temperature of 20° C. or more (e.g., 25° C. or more, 30° C. or more, 35° C. or more, 40° C. or more, 45° C. or more, 50° C. or more, 55° C. or more, 60° C. or more, 65° C. or more, 70° C. or more, 75° C. or more, 80° C. or more, or 85° C. or more). In some examples, the monomers can be polymerized at a polymerization temperature of 95° C. or less (e.g., 90° C. or less, 85° C. or less, 80° C. or less, 75° C. or less, 70° C. or less, 65° C. or less, 60° C. or less, 55° C. or less, 50° C. or less, 45° C. or less, 40° C. or less, 35° C. or less, or 30° C. or less). The polymerization temperature that the monomers are polymerized at can range from any of the minimum values described above to any of the maximum values described above. For example, the monomers can be polymerized at a polymerization temperature of from 20° C. to 95° C. (e.g., from 20° C. to 60° C., from 60° C. to 95° C., from 20° C. to 45° C., from 45° C. to 70° C., from 70° C. to 95° C., or from 30° C. to 85° C.).

After the initial charge, the monomers that are to be used in the polymerization can be continuously fed to the reactor in one or more monomer feed streams. The monomers can be supplied as a pre-emulsion in an aqueous medium. An initiator feed stream can also be continuously added to the reactor at the time the monomer feed stream is added although it may also be desirable to include at least a portion of the initiator solution to the reactor before adding a monomer pre-emulsion if one is used in the process. The monomer and initiator feed streams are typically continuously added to the reactor over a predetermined period of time (e.g., the feed time) to cause polymerization of the monomers and to thereby produce the polymer dispersion. The monomers can be provided over a feed time of 2 hours or more (e.g., 2.5 hours or more, 3 hours or more, 3.5 hours or more, 4 hours or more, 4.5 hours or more, 5 hours or more, 5.5 hours or more, 6 hours or more, 6.5 hours or more, 7 hours or more, 7.5 hours or more, 8 hours or more, 8.5 hours or more, or 9 hours or more). In some examples, the monomers can be provided over a feed time of 10 hours or less (e.g., 9.5 hours or less, 9 hours or less, 8.5 hours or less, 8 hours or less, 7.5 hours or less, 7 hours or less, 6.5 hours or less, 6 hours or less, 5.5 hours or less, 5 hours or less, 4.5 hours or less, 4 hours or less, 3.5 hours or less, or 3 hours or less). The feed time can range from any of the minimum values described above to any of the maximum values described above. For example, the monomers can be provided over a feed time of from 2 hours to 10 hours (e.g., from 3 hours to 6 hours)).

A surfactant can be added as part of either the monomer stream or the initiator feed stream although they can be provided in a separate feed stream. Furthermore, one or more buffers can be included in either the monomer or initiator feed streams or provided in a separate feed stream to modify or maintain the pH of the reactor.

As mentioned above, the monomer feed stream can include one or more monomers (e.g., vinyl acetate; acrylate monomer; carboxylic acid, carboxylic acid anhydride, or a combination thereof; organosilane; and maltodextrin). The monomers can be fed in one or more feed streams with each stream including one or more of the monomers being used in the polymerization process. For example, the vinyl acetate; acrylate monomer; carboxylic acid, carboxylic acid anhydride, or a combination thereof; organosilane; and the maltodextrin can be provided in separate monomer feed streams or can be added as a pre-emulsion. It can also be advantageous to delay the feed of certain monomers to provide certain polymer properties or to provide a layered or multiphase structure (e.g., a core/shell structure). In some examples, the copolymers are polymerized in multiple stages to produce particles having multiple phases. In some examples, the copolymers are polymerized in a single stage to produce a single phase particle.

The initiator feed stream can include at least one initiator or initiator system that is used to cause the polymerization of the monomers in the monomer feed stream. The initiator stream can also include water and other desired components appropriate for the monomer reaction to be initiated. The initiator can be any initiator known in the art for use in emulsion polymerization such as azo initiators; ammonium, potassium or sodium persulfate; or a redox system that typically includes an oxidant and a reducing agent. Commonly used redox initiation systems are described, e.g., by A. S. Sarac in *Progress in Polymer Science* 24, 1149-1204 (1999). Exemplary initiators include azo initiators and aqueous solutions of sodium persulfate. The initiator stream can optionally include one or more buffers or pH regulators. In some examples, ammonia is not used during polymerization of the copolymers. Accordingly, the copolymer compositions can be free or substantially free of ammonia.

In addition to the monomers and initiator, a surfactant (i.e., emulsifier) such as those described herein can be fed to the reactor. The surfactant can be provided in the initial charge of the reactor, provided in the monomer feed stream, provided in an aqueous feed stream, provided in a pre-emulsion, provided in the initiator stream, or a combination thereof. The surfactant can also be provided as a separate continuous stream to the reactor.

Once polymerization is completed, the polymer dispersion can be chemically stripped thereby decreasing its residual monomer content. This stripping process can include a chemical stripping step and/or a physical stripping step. In some examples, the polymer dispersion is chemically stripped by continuously adding an oxidant such as a peroxide (e.g., t-butylhydroperoxide) and a reducing agent (e.g., sodium acetone bisulfite), or another redox pair to the reactor at an elevated temperature and for a predetermined period of time (e.g., 0.5 hours). Suitable redox pairs are described by A. S. Sarac in *Progress in Polymer Science* 24, 1149-1204 (1999). An optional defoamer can also be added if needed before or during the stripping step. In a physical stripping step, a water or steam flush can be used to further eliminate the non-polymerized monomers in the dispersion. Once the stripping step is completed, the pH of the polymer dispersion can be adjusted and a biocide or other additives can be added. Deformers, coalescing aids, or a plasticizer can be added after the stripping step or at a later time if desired. Cationic, anionic, and/or amphoteric surfactants or polyelectrolytes may optionally be added after the stripping step or at a later time if desired in the end product to provide a cationic or anionic polymer dispersion.

Once the polymerization reaction is complete, and the stripping step is completed, the temperature of the reactor can be reduced.

A number of embodiments of the invention have been described. Nevertheless, it will be understood that various modifications may be made without departing from the spirit and scope of the invention. Accordingly, other embodiments are within the scope of the following claims.

The examples below are intended to further illustrate certain aspects of the systems and methods described herein, and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. There are numerous variations and combinations of measurement conditions, e.g., component concentrations, temperatures, pressures and other measurement ranges and conditions that can be used to optimize the described process.

Example 1

An example of a carpet latex composition and the corresponding evaluation are described below.

A carpet formulation was prepared with the components shown in Table 1, where the was 7.01 (controlled using NaOH).

TABLE 1

Materials for the carpet formulation.

| | TSC | BASE 1 |
|---|---|---|
| Latex Binder | 52.58 | 100 |
| Sodium Salt of Acrylic Polymer | 41.6 | 0.4 |
| other additive | 50 | 1.35 |

Carpet formulations A, B, C, and D were prepared as shown in Table 2. The properties of carpet formulations A, B, C, and D are shown in Table 3.

TABLE 2

Materials for the carpet formulations A, B, C, and D.

| | TSC | A | B | C | D |
|---|---|---|---|---|---|
| Latex Binder of the Invention | 52.49 | 100 | 100 | 100 | 100 |
| ground calcium carbonate | 100 | 200 | 250 | 300 | 350 |
| anionic surfactant blend | 30 | 0.25 | 0.25 | 0.25 | 0.25 |
| starch dispersion | 45 | 3 | 3 | 3 | 3 |
| alkali-swellable emulsion thickener | 15.5 | 1 | 1 | 1 | 1 |

TABLE 3

Properties of carpet formulations A, B, C, and D.

| | A | B | C | D |
|---|---|---|---|---|
| Predicted Solids, % | 74.5 | 77.3 | 79 | 79 |
| VISC SPEC (RVT, #5, 20 rpm): | 7000-9000 cp | 7000-9000 cp | 7000-9000 cp | 7000-9000 cp |
| V A F (viscosity after filler) | 1700 | 2000 | 1800 | 1400 |
| TD (Thickener Demand) | 7.17 | 5.46 | 5.27 | 8.92 |
| Initial Viscosity, cp | 8400 | 8200 | 8400 | 8000 |
| Froth Rate, % | 52.01 | 60.98 | 74.91 | 68.11 |
| Froth Viscosity, cp | 13000 | 14100 | 17600 | 15500 |
| Viscosity after 1 Day, cp | 8000 | 7200 | 7400 | 8600 |
| Tensile, psi | 341 | 454.46 | 565.28 | 575.21 |
| Elongation, % | 36.96 | 19.43 | 11.13 | 7.88 |
| Cup Coat Wt | 67.81 | 68.89 | 69.45 | 68.11 |
| Precoat only on Nylon Loop carpet Tuft Bind Dry, psi | 15.04 | 13.06 | 13.39 | 11.88 |
| Precoat only on Nylon Loop carpet Velcro Rating Dry range (1 (poor) to 5 (no fuzzing)) | 5 | 5 | 4.5 | 5 |
| Bundle Wrap % | 99.5 | 99.3 | 99.4 | 99.4 |
| Tuft Bind Dry, lb * force | — | — | 11.43 | 10.33 |
| Tuft Bind 1 min Wet, units | — | — | 10.52 | 7.97 |
| Tuft Bind 20 min Wet, units | — | — | 6.65 | 4.06 |
| Velcro Rating 20 min Wet, units | — | — | 3 | 2.5 |

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

The methods of the appended claims are not limited in scope by the specific methods described herein, which are intended as illustrations of a few aspects of the claims and any methods that are functionally equivalent are intended to fall within the scope of the claims. Various modifications of the methods in addition to those shown and described herein are intended to fall within the scope of the appended claims. Further, while only certain representative method steps disclosed herein are specifically described, other combinations of the method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

What is claimed is:

1. An aqueous dispersion comprising water and a copolymer derived from:
    vinyl acetate;
    an acrylate monomer having a glass transition temperature ($T_g$) of −30° C. or less, wherein the acrylate monomer comprises butyl acrylate, 2-ethylhexyl acrylate, or a combination thereof;
    a carboxylic acid, a carboxylic acid anhydride, or a combination thereof, selected from the group consisting of (meth)acrylic acid, itaconic acid, crotonic acid, fumaric acid, maleic acid, anhydrides thereof, and combinations thereof; and
    an organosilane;
    in the presence of maltodextrin.

2. The aqueous dispersion of claim 1, wherein the copolymer is derived from 30-90% by weight vinyl acetate based on the total monomer weight.

3. The aqueous dispersion of claim 1, wherein the copolymer is derived from 45-75% by weight vinyl acetate, based on the total monomer weight.

4. The aqueous dispersion of claim 1, wherein the acrylate monomer comprises butyl acrylate.

5. The aqueous dispersion of claim 1, wherein the copolymer is derived from 20-70% by weight of the acrylate monomer, based on the total monomer weight.

6. The aqueous dispersion of claim 1, wherein the copolymer is derived from 30-60% by weight of the acrylate monomer, based on the total monomer weight.

7. The aqueous dispersion of claim 1, wherein the carboxylic acid comprises acrylic acid.

8. The aqueous dispersion of claim 1, further comprising a second (co)polymer.

9. The aqueous dispersion of claim 8, wherein the second (co)polymer comprises an acrylic (co)polymer, a carboxylated or non-carboxylated styrene-butadiene (co)polymer, or a combination thereof.

10. The aqueous dispersion of claim 1, wherein the aqueous dispersion has an overall solids content of from 40% to 75%.

11. The aqueous dispersion of claim 1, wherein the aqueous dispersion has an overall solids content of from 55% to 75%.

12. The aqueous dispersion of claim 1, wherein the aqueous dispersion comprises a plurality of copolymer particles having a volume average particle size of from 80 nm to 500 nm.

13. An adhesive formulation, comprising the aqueous dispersion of claim 12, wherein the formulation has a minimum viscosity of 5,000 Cp or more and does not fluctuate more than 1000 Cp over a 1 day period as measured by a #5 spindle at 20 RPM on a Brookfield viscometer at a solids content of 75-85%.

14. A carpet tile having a surface coated with an adhesive formulation, wherein the adhesive formulation comprises an aqueous dispersion comprising water and a copolymer derived from:
    vinyl acetate;
    an acrylate monomer having a glass transition temperature ($T_g$) of −30° C. or less;
    a carboxylic acid, a carboxylic acid anhydride, or a combination thereof; and
    an organosilane;
    in the presence of maltodextrin;
    wherein the adhesive formulation has a minimum viscosity of 5,000 Cp or more and does not fluctuate more than 1000 Cp over a 1 day period as measured by a #5 spindle at 20 RPM on a Brookfield viscometer at a solids content of 75-85%; and
    wherein the aqueous dispersion comprises a plurality of copolymer particles having a volume average particle size of from 80 nm to 500 nm.

15. The carpet tile according to claim 14, wherein the copolymer is derived from 30-90% by weight vinyl acetate based on the total monomer weight, the acrylate monomer comprises butyl acrylate, 2-ethylhexyl acrylate, or a combination thereof, and the carboxylic acid, carboxylic acid anhydride, or combination thereof is selected from the group consisting of (meth)acrylic acid, itaconic acid, crotonic acid, fumaric acid, maleic acid, anhydrides thereof, and combinations thereof.

16. The carpet tile according to claim 15, wherein the acrylate monomer is butyl acrylate and the carboxylic acid is acrylic acid.

17. A method comprising applying an adhesive formulation to a carpet tile, wherein the adhesive formulation comprises an aqueous dispersion comprising water and a copolymer derived from:
vinyl acetate;
an acrylate monomer having a glass transition temperature ($T_g$) of −30° C. or less;
a carboxylic acid, a carboxylic acid anhydride, or a combination thereof; and
an organosilane;
in the presence of maltodextrin;
wherein the adhesive formulation has a minimum viscosity of 5,000 Cp or more and does not fluctuate more than 1000 Cp over a 1 day period as measured by a #5 spindle at 20 RPM on a Brookfield viscometer at a solids content of 75-85%.

18. The method of claim 17, wherein the copolymer is derived from 30-90% by weight vinyl acetate based on the total monomer weight, the acrylate monomer comprises butyl acrylate, 2-ethylhexyl acrylate, or a combination thereof, and the carboxylic acid, carboxylic acid anhydride, or combination thereof is selected from the group consisting of (meth)acrylic acid, itaconic acid, crotonic acid, fumaric acid, maleic acid, anhydrides thereof, and combinations thereof.

19. The method of claim 18, wherein the acrylate monomer is butyl acrylate and the carboxylic acid is acrylic acid.

* * * * *